(12) United States Patent
Li et al.

(10) Patent No.: US 11,029,492 B2
(45) Date of Patent: Jun. 8, 2021

(54) LENS MODULE AND ELECTRONIC DEVICE INCLUDING GAS ESCAPE STRUCTURE

(71) Applicant: TRIPLE WIN TECHNOLOGY (SHENZHEN) CO. LTD., Shenzhen (CN)

(72) Inventors: Kun Li, Guangdong (CN); Shin-Wen Chen, New Taipei (TW); Long-Fei Zhang, Guangdong (CN); Xiao-Mei Ma, Guangdong (CN)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 16/560,004

(22) Filed: Sep. 4, 2019

(65) Prior Publication Data

US 2020/0192064 A1 Jun. 18, 2020

(30) Foreign Application Priority Data

Dec. 15, 2018 (CN) .......................... 201822113499.3

(51) Int. Cl.
*G02B 13/00* (2006.01)
*G02B 6/44* (2006.01)
*H04N 5/225* (2006.01)
*G02B 5/20* (2006.01)

(52) U.S. Cl.
CPC ....... *G02B 13/0015* (2013.01); *G02B 6/4427* (2013.01); *H04N 5/2254* (2013.01); *G02B 5/20* (2013.01)

(58) Field of Classification Search
CPC .... G02B 13/0015; G02B 6/4427; G02B 5/20; H04N 5/2254; H04N 5/2253; H04N 5/2257

See application file for complete search history.

(56) References Cited

U.S. PATENT DOCUMENTS

| 8,976,291 | B2* | 3/2015 | Chen | H04N 5/2257 348/374 |
| 2004/0239794 | A1* | 12/2004 | Saito | G02B 7/022 348/340 |
| 2009/0052887 | A1* | 2/2009 | Cheng | H04N 5/2257 396/529 |
| 2016/0191767 | A1* | 6/2016 | Otani | G03B 17/02 348/373 |
| 2017/0353646 | A1* | 12/2017 | Wang | H04N 5/247 |

* cited by examiner

*Primary Examiner* — Luong T Nguyen
(74) *Attorney, Agent, or Firm* — ScienBiziP, P.C.

(57) ABSTRACT

A lens module includes a circuit board, a carrier, and an optical filter. The carrier is fixed on a surface of the circuit board. The carrier defines a through hole. The optical filter is mounted on the carrier. The carrier defines at least one gas escape structure. A receiving space is between the optical filter and the circuit board, and the gas escape structure communicates with the receiving space to release water vapor in the receiving space and allow air pressure equalization and thus the relief of stress. The disclosure further provides an electronic device including the lens module.

16 Claims, 6 Drawing Sheets

LENS MODULE AND ELECTRONIC DEVICE INCLUDING GAS ESCAPE STRUCTURE

FIELD

The subject matter relates to imaging.

BACKGROUND

Portable electronic devices, such as cell phones, tablet computers, and multimedia players, usually include lens modules. The lens module includes a lens, an optical filter, a bracket, an image sensor, and a circuit board. The optical filter is mounted to the bracket through adhesive, and the adhesive is solidified by curing. However, water vapor generated during curing may not be able to escape from the bracket, which may form water mist or droplets on the surfaces of the optical filter and the image sensor. Thus, the image quality of the lens module is lowered. In addition, during curing, the air in the lens module is expanded and causes stress, which further lowers the imaging quality of the lens module.

BRIEF DESCRIPTION OF THE DRAWINGS

Implementations of the present technology will now be described, by way of embodiments, with reference to the attached figures.

DETAILED DESCRIPTION

Figure 1:
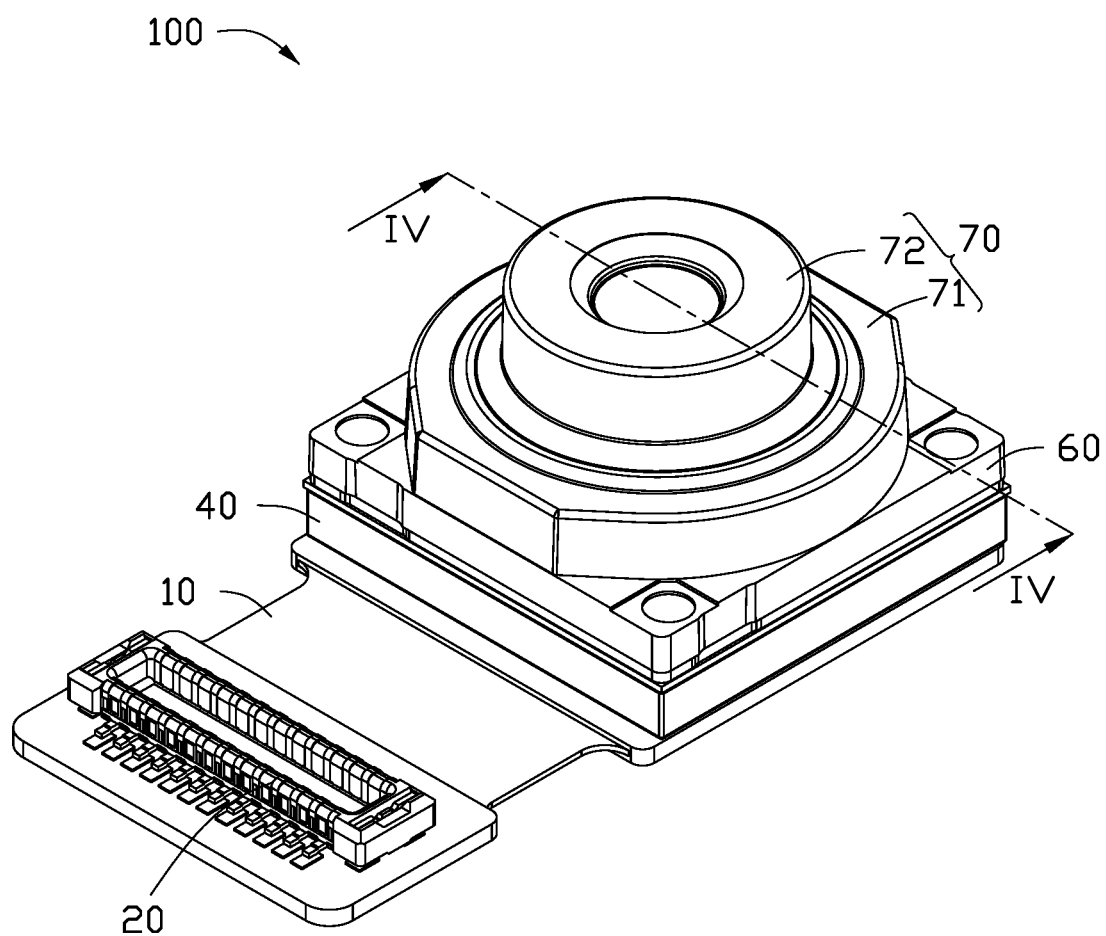
FIG. 1 is a diagrammatic view of an embodiment of a lens module.

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 2:
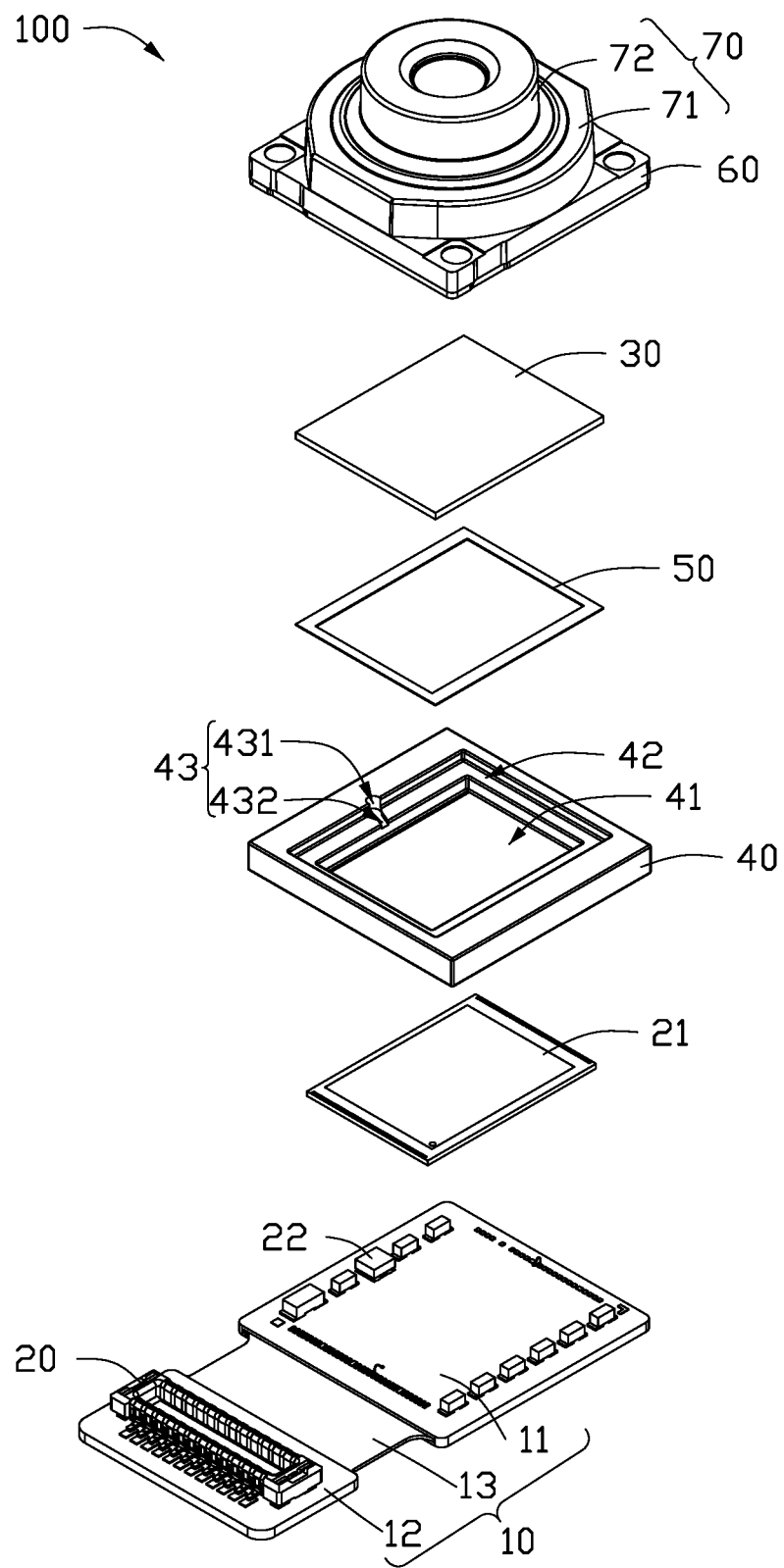
FIG. 2 is an exploded diagram of the lens module of FIG. 1.
Figure 3:
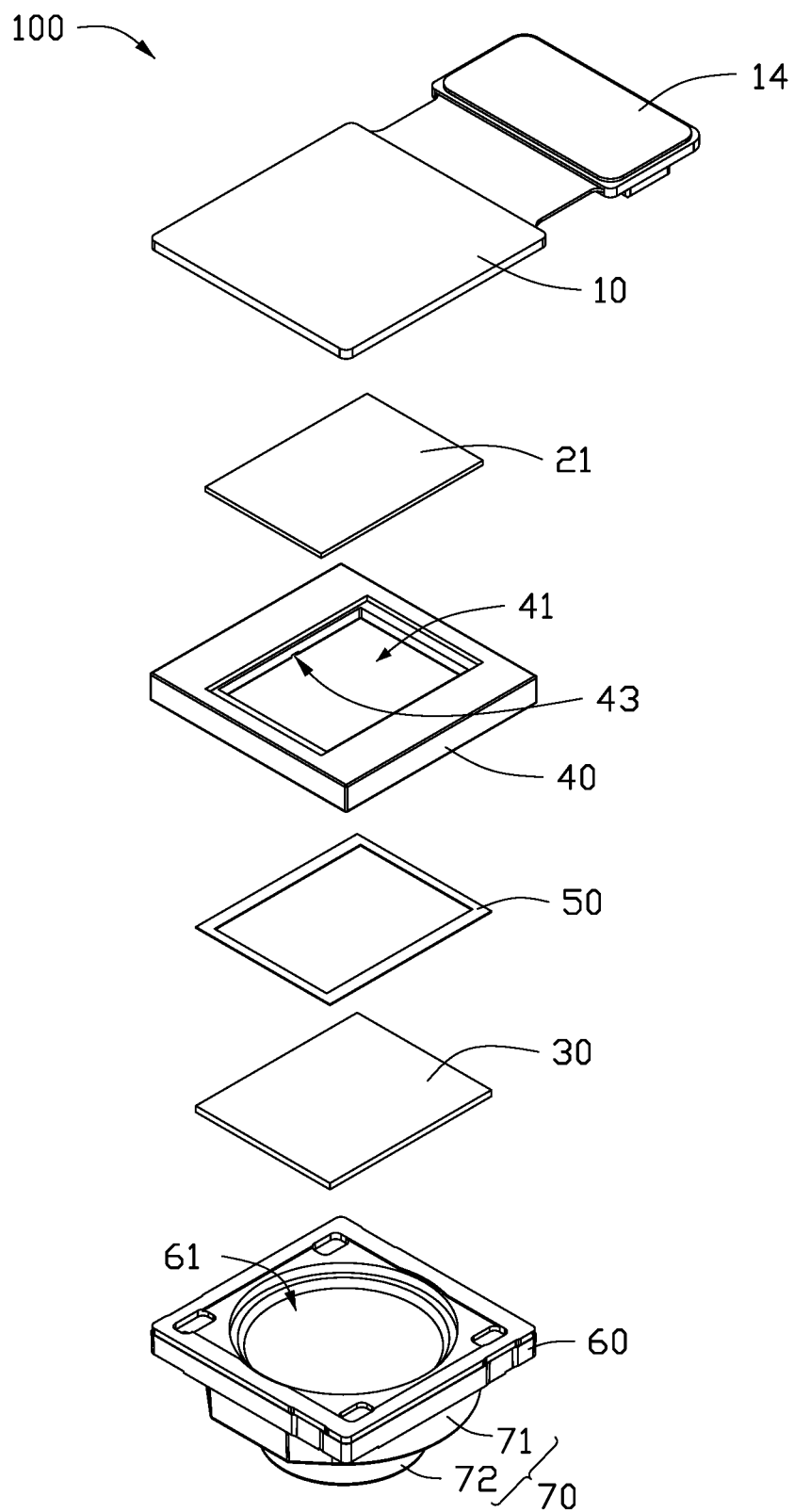
FIG. 3 is an exploded diagram of the lens module of FIG. 1 from another angle.

FIGS. 1 to 3 illustrate an embodiment of a lens module 100. The lens module 100 includes a circuit board 10, an optical filter 30, a carrier 40, a lens holder 60, and a lens 70.

In an alternative embodiment, the circuit board 10 can be a flexible board, a rigid board, or a rigid-flexible board. In an alternative embodiment, the circuit board 10 is a rigid-flexible board that includes a first rigid board portion 11, a second rigid board portion 12, and a flexible board portion 13 arranged between the first rigid board portion 11 and the second rigid board portion 12. A first surface of the second rigid board portion 12 carries an electrical connection portion 20. When the lens module 100 is connected to an electronic device through the electrical connection portion 20, the electrical connection portion 20 is configured to implement signal transmission between the lens module 100 and an electronic device (not shown). The electrical connection 20 can be a gold fingers connector (edge connector) or other connector. A second surface of the second rigid board portion 12 carries a reinforcing plate 14. The reinforcing plate 14 is made of metal (such as stainless steel).

The lens module 100 further includes an image sensor 21 and a plurality of electronic components 22. The image sensor 21 and the electronic components 22 are mounted on a first surface of the first rigid board portion 11. The image sensor 21, the electronic components 22, and the electrical connection portion 20 are located on a same surface of the circuit board 10. Each electronic component 22 can be a passive component such as a resistor, a capacitor, a diode, a transistor, a relay, or an electrically erasable programmable read only memory (EEPROM).

The carrier 40 is mounted on the first surface of the first rigid board portion 11 of the circuit board 10. The carrier 40, the image sensor 21, the electronic components 22, and the electrical connection portion 20 are located on the same surface of the circuit board 10. The carrier 40 is a hollow rectangular structure. The carrier 40 defines a through hole 41. The carrier 40 defines a first surface away from the circuit board. An area of the first surface of the carrier 40 adjacent to the through hole 41 is recessed inwardly to form a groove 42. The first surface of the carrier 40 further defines a gas escape structure 43. The gas escape structure 43 is generally L-shaped, and includes a first escape structure portion 431 and a second escape structure portion 432. The first escape structure portion 431 is a slot that is defined at a sidewall of the groove 42 and defines an opening 44 on the first surface of the carrier 40. The second escape structure portion 432 is also a slot that is defined at the bottom of the groove 42 and communicates with the first escape structure portion 431. The carrier 40 can be made of metal or plastic. In an alternative embodiment, the carrier 40 is made of plastic.

Figure 4:
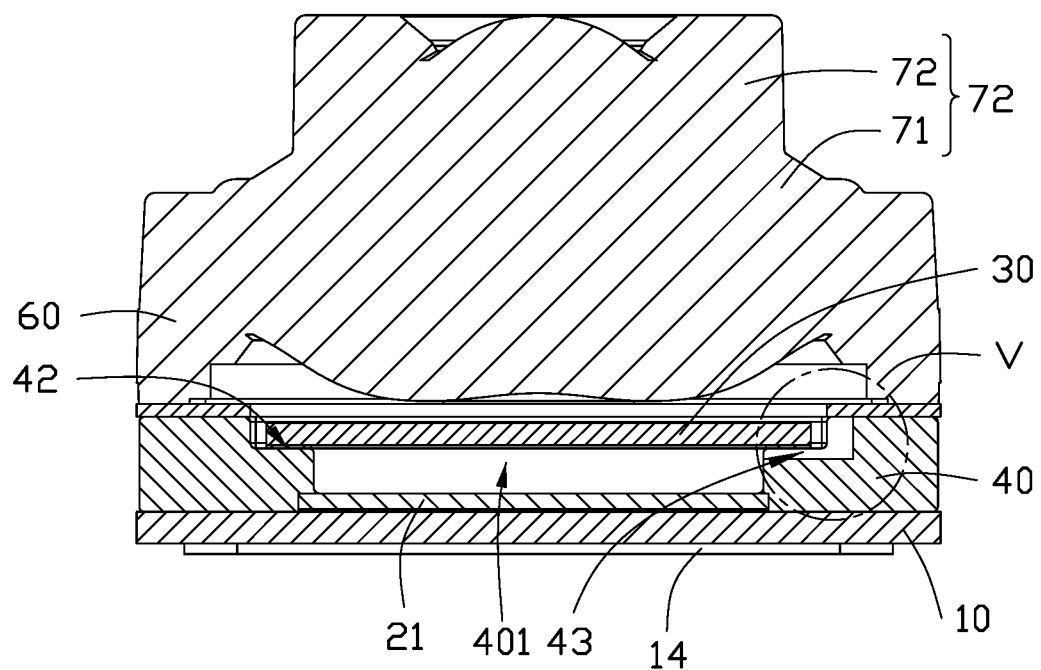
FIG. 4 is a cross-sectional view taken along line IV-IV of FIG. 1.
Figure 5:
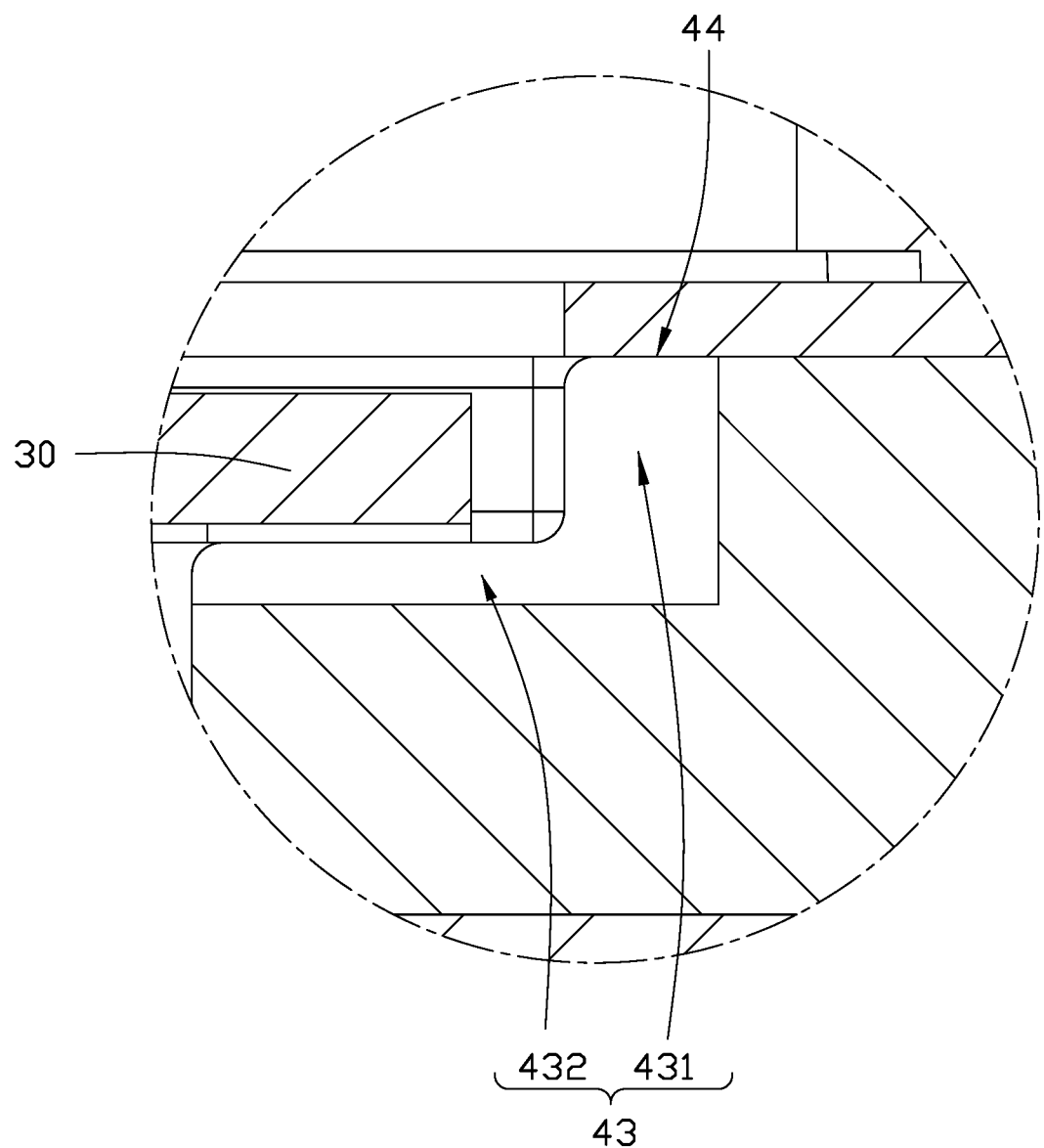
FIG. 5 is an enlarged view of circled portion V of the lens module of FIG. 4.

Referring to FIG. 4 and FIG. 5, the optical filter 30 is mounted in the groove 42 of the carrier 40 through an adhesive layer 50, and is spaced away from the image sensor 21. In an alternative embodiment, the optical filter 30 is rectangular. The optical filter 30 and the circuit board 10 close opposite ends of the through hole 41 to form a receiving space 401. The gas escape structure 43 connects the receiving space 401 to the opening 44. In an alternative embodiment, during assembly, the optical filter 30 is first fixed in the groove 42 of the carrier 40 by an adhesive (not shown). The adhesive is then cured to form the adhesive layer 50, thereby causing the optical filter 30 to be fixed in the groove 42 of the carrier 40. The escape structure 43 is configured to allow water vapor generated in the receiving space 401 to escape through the opening 44, which prevents the formation of water mist or water droplets on the surface of the optical filter 30 and the image sensor 21, and further improves the image quality of the lens module 100. In addition, the gas escape structure 43 is also capable of relieving stress generated by pressure build-up, thus the imaging quality of the lens module 100 is further ensured.

The lens holder 60 is mounted on the first surface of the carrier 40. The lens holder 60 has a hollow rectangular structure and defines a receiving hole 61 (shown in FIG. 3). The lens holder 60 is made of metal or plastic. In an alternative embodiment, the lens holder 60 is made of plastic. During curing the adhesive, the water vapor escapes through the opening. After the adhesive is cured the lens holder 60 is then mounted on the first surface of the carrier 40. The lens holder 60 can close the opening 44 to prevent dust from outside entering the interior of the lens module 100 through the opening 44.

The lens 70 is partially received in the receiving hole 61 of the lens holder 60. The lens 70 and the lens holder 60 can be formed separately or as an integral unit. In an alternative embodiment, the lens 70 and the lens holder 60 are integral. The lens 70 includes a first lens portion 71 and a second lens portion 72. A diameter of the first lens portion 71 is greater than the diameter of the second lens portion 72. The lens 70 can be assembled (that is, the first lens portion 71 and the second lens portion 72 are separate items assembled to each other) or can be integrally formed. In an alternative embodiment, the first lens portion 71 and the second lens portion 72 of the lens 70 are integrally formed to form the lens 70. The first lens portion 71 is partially received in the receiving hole 61 (shown in FIG. 3).

In an alternative embodiment, the groove 42 can be omitted. The optical filter 30 can be directly mounted on the carrier 40 or be mounted in the through hole 41 of the carrier 40. For example, adhesive can be applied to the outer peripheral wall of the optical filter 30 and the inner peripheral wall of the carrier 40 to mount the optical filter 30 to the carrier 40. The optical filter 30 and the carrier 40 can also be mounted together by a simple friction (interference) fit. The optical filter 30 and the carrier 40 can also be mounted together by other manners.

The structure of the gas escape structure 43 can be varied according to need. For example, the gas escape structure 43 can be a straight through hole defined on a sidewall of the carrier 40, as long as the through hole can communicate with the receiving space 401 to allow escape of water vapor.

Figure 6:
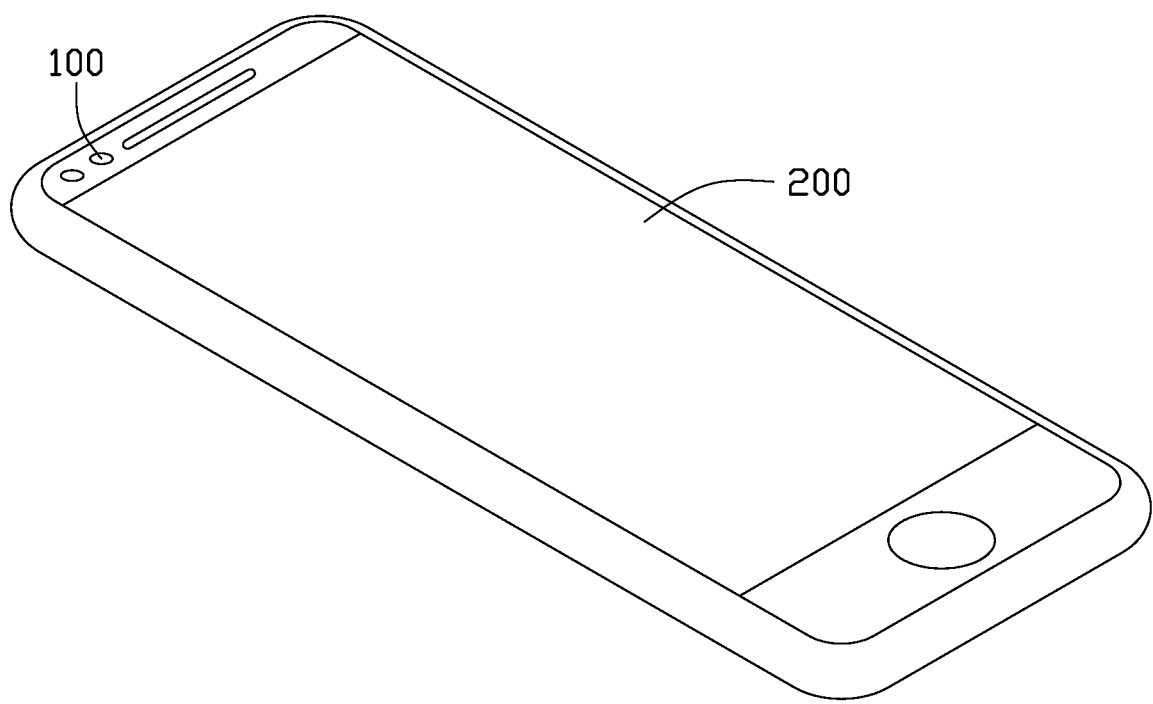
FIG. 6 is a perspective view of an electronic device including the lens module of FIG. 1.

FIG. 6 illustrates an embodiment of an electronic device 200. The electronic device 200 includes the lens module 100. The electronic device 200 can be any electronic device having imaging capturing functions, such as mobile phones, wearable devices, computer devices, vehicles, or monitoring devices. In an alternative embodiment, the electronic device 200 is a mobile phone.

The gas escape structure 43 defined on the carrier 40 functions as a passage communicating with the receiving space 401, to allow the release of water vapor and the relief of stress caused by unequal air pressures. Thereby the imaging quality of the lens module 100 is improved.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:
1. A lens module comprising:
a circuit board;
a carrier fixed on the circuit board and defining a surface away from the circuit board, the surface of the carrier defining a through hole, a groove adjacent to the through hole, and a gas escape structure;
an optical filter; and
a lens holder mounted on the surface of the carrier;
wherein the optical filter is fixed in the groove through an adhesive layer, the optical filter and the circuit board close opposite ends of the through hole to form a receiving space, the gas escape structure communicates with the receiving space to allow the release of water vapor generated in the receiving space;
the gas escape structure comprises a first gas escape structure portion and a second gas escape structure portion, the first gas escape structure portion is defined on a sidewall of the groove and defines an opening on the surface of the carrier, the second escape structure portion is defined at a bottom of the groove and communicates with the first escape structure portion, the lens holder closes the opening.

2. The lens module of claim 1, wherein the circuit board is a rigid-flexible board and comprises
a first rigid board portion,
a second rigid board portion, a first surface of the second rigid board portion carrying an electrical connection portion, and
a flexible board portion arranged between the first board rigid portion and the second rigid board portion.

3. The lens module of claim 2, wherein a first surface of the first rigid board portion carries an image sensor and a plurality of electronic components, the image sensor, the plurality of electronic components, and the electrical connection portion are located on a same surface of the circuit board, the image sensor is received in the receiving space.

4. The lens module of claim 3, wherein the carrier is disposed on the first surface of the first rigid board portion of the circuit board.

5. The lens module of claim 3, wherein the first rigid board portion further defines a second surface opposite to the first surface of the first rigid board portion, the second surface of the first rigid board portion carries a reinforcing plate.

6. The lens module of claim 1, wherein the lens module further comprises a lens, the lens is mounted in the lens holder.

7. The lens module of claim 6, wherein the lens holder has a rectangular structure and defines a receiving hole, the lens is partially received in the receiving hole.

8. The lens module of claim 7, wherein the lens comprises a first lens portion partially received in the receiving hole and a second lens portion, a diameter of the first lens portion is greater than a diameter of the second lens portion, the lens is assembled or is integrally formed.

9. An electronic device comprising a lens module, the lens module comprising:
a circuit board;
a carrier fixed on the circuit board and defining a surface away from the circuit board, the surface of the carrier defining a through hole, a groove adjacent to the through hole, and a gas escape structure;
an optical filter; and
a lens holder mounted on the surface of the carrier;
wherein the optical filter is fixed in the groove through an adhesive layer, the optical filter and the circuit board close opposite ends of the through hole to form a receiving space, the gas escape structure communicates with the receiving space to allow the release of water vapor generated in the receiving space;

the gas escape structure comprises a first gas escape structure portion and a second gas escape structure portion, the first gas escape structure portion is defined on a sidewall of the groove and defines an opening on the surface of the carrier, the second escape structure portion is defined at a bottom of the groove and communicates with the first escape structure portion, the lens holder closes the opening.

10. The electronic device of claim 9, wherein the circuit board is a rigid-flexible board and comprises a first rigid board portion, a second rigid board portion, a first surface of the second rigid board portion carrying an electrical connection portion, and a flexible board portion arranged between the first board rigid portion and the second rigid board portion.

11. The electronic device of claim 10, wherein a first surface of the first rigid board portion carries an image sensor and a plurality of electronic components, the image sensor, the plurality of electronic components, and the electrical connection portion are located on a same surface of the circuit board, the image sensor is received in the receiving space.

12. The electronic device of claim 11, wherein the carrier is disposed on the first surface of the first rigid board portion of the circuit board.

13. The electronic device of claim 11, wherein the first rigid board portion further defines a second surface opposite to the first surface of the first rigid board portion, the second surface of the first rigid board portion carries a reinforcing plate.

14. The electronic device of claim 9, wherein the lens module further comprises a lens, the lens is mounted in the lens holder.

15. The electronic device of claim 14, wherein the lens holder has a rectangular structure and defines a receiving hole, the lens is partially received in the receiving hole.

16. The electronic device of claim 15, wherein the lens comprises a first lens portion partially received in the receiving hole and a second lens portion, a diameter of the first lens portion is greater than a diameter of the second lens portion, the lens is assembled or is integrally formed.

* * * * *